Aug. 7, 1945.     F. F. BEIL     2,381,029
METHOD AND MEANS FOR SUPPORTING SCREEN CLOTH
Filed May 11, 1943
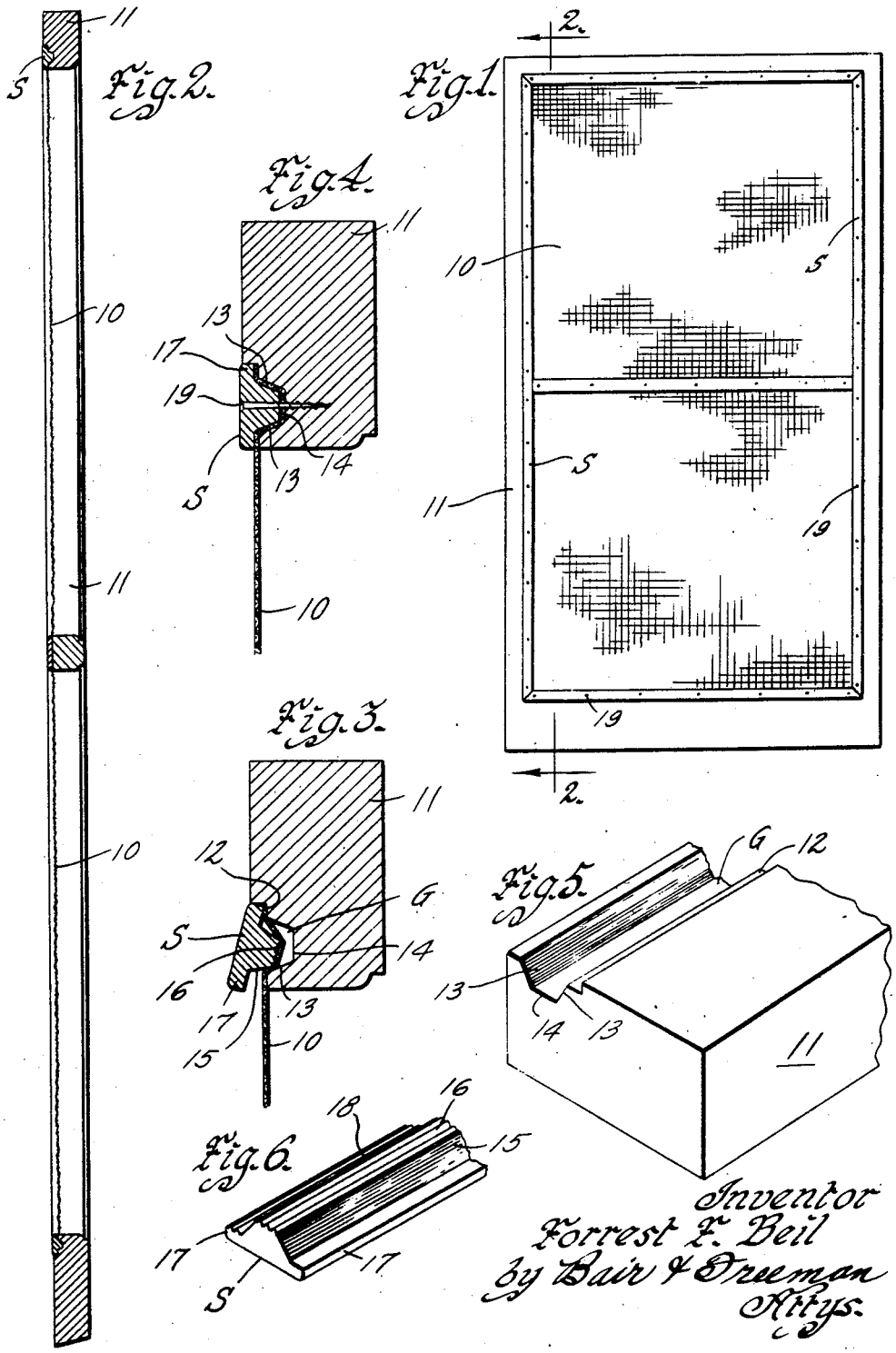

Patented Aug. 7, 1945

2,381,029

UNITED STATES PATENT OFFICE 2,381,029

METHOD AND MEANS FOR SUPPORTING SCREEN CLOTH

Forrest F. Beil, Clinton, Iowa, assignor to Curtis Companies Incorporated, Clinton, Iowa, a corporation of Iowa Application May 11, 1943, Serial No. 486,535

2 Claims. (Cl. 160—395)

My invention relates to a method and means for supporting plastic screen cloth.

Particularly it is my object to provide a method and means for supporting plastic screen cloth in a frame or the like in such manner that it will be held taut, yet will not be pulled out of shape.

With this and other objects in view, my invention consists in the construction, arrangement and combination of the various parts of my device whereby the objects contemplated are attained, as hereinafter more fully set forth, pointed out in my claims and illustrated in the accompanying drawing, wherein:

Figure 1 is an elevation of a frame having sheets of plastic screen cloth supported in accordance with my invention.

Figure 2 is a detail sectional view taken on the line 2—2 of Figure 1.

Figure 3 is an enlarged vertical sectional view illustrating the position of the holder strip at one stage in its application.

Figure 4 is a similar view showing the holder strip in its final position.

Figure 5 is a perspective view of a portion of the support for the screen cloth illustrating the preferred shape of the rabbet and groove therein.

Figure 6 is a perspective view of the underside of one of the holder strips.

On account of the great scarcity of metal, manufacturers have succeeded in making screen cloth of plastic fibers. A sheet of such cloth is indicated in the drawing at 10.

Plastic screen cloth has some very distinct advantages over and above the fact that it can be used in many places as a substitute for metal screen cloth. The material is of very light weight so that the finished screen cloth is much lighter than metal screen cloth. The material is itself translucent and the plastic screen cloth transmits more light than metal screen cloth of the same mesh. The plastic screen cloth does not require the painting or lacquering which is essential for the preservation of wire products. The plastic product does not corrode or stain the frame as ordinary wire cloth is likely to do. There may be therefore a permanent field for plastic screen cloth. It is important, therefore, that suitable means be provided for mounting it on a support, and particularly on a frame.

It has been found exceedingly difficult to put plastic screen cloth in a frame such as might be used on windows or screen doors, and to keep the cloth taut, as it pulls out of shape much more easily than does wire screen cloth. Many expedients have been tried for fastening the plastic screen cloth in place in such manner that it would be kept smooth and tight and would not be pulled out of shape, and, so far as I am aware none of them have been successful prior to the development of the method and means herein described.

If plastic screen cloth is pulled at the edges and tacked, it will not stay smooth but will be formed into waved strips where the tacks are, and not stretched between them. Where my method and means are employed these disadvantageous results can be avoided.

I provide a support 11 which may have the shape of an ordinary window screen frame. Adjacent the inner edge of each member of the frame, a groove G is formed, which preferably has inclined side walls 13 and a flat bottom wall 14 and in one face of that groove there is provided a rabbet 12. The shape of the groove may be changed without departing from the principal features of my invention, but I have found, after numerous experiments, that a groove with inclined walls is the easiest to work with and affords the best ultimate results. A curved wall will do under some circumstances.

For cooperating with the groove G and the edge of the strip 10 of plastic screen cloth, I provide a holding strip indicated generally at S, having a portion 15 adapted to press the screen cloth into the groove G and to substantially fit the groove and having approximately the same cross sectional shape as the groove. That part of the portion 15 which rests adjacent the bottom 14 of the groove is roughened as, for instance, by lengthwise corrugations 16 for better gripping the screen cloth.

The holding strip S is provided with flanges 17 which, when the holding strip is in screen-holding position, fit against the support alongside the groove and are received in the rabbet 12.

The holding strip S may be of such size that its outer face is flush with the face of the frame or support 11, or the strip may be so shaped that it projects a little from the support 11 for ornamental or other purposes.

One of the flanges 17 may be corrugated on its underside as indicated on 18 to better grip the screen cloth particularly during the installation of the holding strip.

I shall now describe the method of applying the holding strip for securing the screen cloth to the support. The edge of the screen cloth is laid across the groove G and one of the flanges 17 is pressed against the screen cloth in the rabbet 12 to grip the screen cloth between the flange 17 and the bottom of the rabbet 12 as, for instance, illustrated in Figure 3. Then the strip S is rocked in such a way as to force the screen cloth into the groove G between the portion 15 of the holding strip and the support 11. The position of the parts midway during the process of pressing the strip S into holding position is shown in Figure 3. By pressing the flange 17 against the screen cloth while the portion 15 is being pressed into place, I find that I can hold the screen cloth and draw it tight and smooth without any substantial distortion.

I prefer to thus grip the edge of the screen cloth between one of the flanges 17 and the support 11 at the bottom of the rabbet 12, for instance as shown in Figure 3. The screen cloth may be gripped between the side of the part 15 and the support, and the strip S may then be rocked into place. I have even found that the holding strip S can be pushed straight into the groove without the rocking movement mentioned and, in many instances, the screen cloth will be pressed properly into place and good results can be obtained. In pushing the portion 15 of the holding strip straight into the groove, it is better to be careful to have the face 15 farthest from the free edge of the screen cloth to press the screen cloth tightly against the complementary face while the portion 15 is being pushed to the bottom of the groove.

It will be understood that the holding strip S can be tacked into place or fastened to the support or frame 11 by means of brads or screws 19.

The particular form of groove and holding strip herein illustrated are the preferred forms, but I have found that I can sometimes use grooves of different shapes and holding strips of different shapes. The corrugations 18 and 16 may be omitted, but I prefer to use them. I believe the corrugations 18 hold the screen cloth in position better during the application of the holding strip and the corrugations 16 hold the screen cloth in position better in the final installation.

I intend to cover by my claims any other modifications in structure which may reasonably come within the scope of my invention and my appended claims.

I claim as my invention:

1. The combination of a sheet of screen cloth or the like, with means for holding it, said means comprising a support, having a groove, and having in one face of the groove a rabbet and a holder strip pressing the cloth into the groove, said strip having a portion substantially fitting the groove and a flange fitting in the rabbet.

2. A method of securing flexible material such, for instance, as screen cloth, to a frame having a groove in each side member thereof, including the steps of gripping the cloth by a holding strip against such member of the frame alongside the groove in such member and on the side of the groove farthest from the frame opening, and rocking the strip for forcing the cloth into the groove without releasing the grip.

FORREST F. BEIL.